(12) United States Patent
Bai et al.

(10) Patent No.: US 11,546,958 B2
(45) Date of Patent: Jan. 3, 2023

(54) BEAM FAILURE RECOVERY RESPONSE

(71) Applicant: QUALCOMM Incorporated, San Diego, CA (US)

(72) Inventors: Tianyang Bai, Somerville, NJ (US); Yan Zhou, San Diego, CA (US); Jung Ho Ryu, Fort Lee, NJ (US); Kiran Venugopal, Raritan, NJ (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 7 days.

(21) Appl. No.: 17/067,242

(22) Filed: Oct. 9, 2020

(65) Prior Publication Data

US 2021/0112619 A1    Apr. 15, 2021

Related U.S. Application Data

(60) Provisional application No. 62/914,398, filed on Oct. 11, 2019.

(51) Int. Cl.
*H04W 76/19* (2018.01)
*H04W 72/04* (2009.01)
*H04L 1/18* (2006.01)

(52) U.S. Cl.
CPC .......... *H04W 76/19* (2018.02); *H04L 1/1812* (2013.01); *H04W 72/042* (2013.01)

(58) Field of Classification Search
CPC ... H04W 76/19; H04W 72/042; H04W 16/28; H04W 24/04; H04W 24/10;
(Continued)

(56) References Cited

U.S. PATENT DOCUMENTS

2018/0302889 A1    10/2018    Guo et al.
2020/0229257 A1    7/2020    Venugopal et al.
(Continued)

FOREIGN PATENT DOCUMENTS

WO    2019032882 A1    2/2019
WO    2019099176 A1    5/2019
(Continued)

OTHER PUBLICATIONS

Apple Inc: "Remaining Issues on Multi-Beam Operation", 3GPP Draft, R1-1909048, 3GPP TSG-RAN WG1 #98, Remaining Issues on Multi-Beam Operation R1, 3RD Generation Partnership Project (3GPP), Mobile Competence Centre, 650, Route Des Lucioles, F-06921 Sophia-Antipolis Cedex, Fra, vol. RAN WG1, No. Prague, CZ, Aug. 26, 2019-Aug. 30, 2019, Aug. 17, 2019 (Aug. 17, 2019), XP051765652, 12 Pages, Retrieved from the Internet: URL: http://www.3gpp.org/ftp/tsg_ran/WG1_RL1/TSGR1_98/Docs/R1-1909048.zip [retrieved on Aug. 17, 2019].
(Continued)

*Primary Examiner* — Habte Mered
(74) *Attorney, Agent, or Firm* — Patterson & Sheridan, L.L.P

(57) ABSTRACT

Certain aspects of the present disclosure provide techniques for managing beam failure recovery operations. A method that may be performed by a user equipment (UE) generally includes performing beam failure detection (BFD) of a beam pair link (BPL) associated with a secondary cell (Scell) of a base station (BS), sending a beam failure recovery request (BFRQ) message in another cell of the BS, the BFRQ message including an indication of a candidate recovery beam for the Scell, and starting a timer based on sending the BFRQ.

29 Claims, 7 Drawing Sheets

(58) Field of Classification Search
CPC ... H04L 1/1812; H04L 1/1848; H04L 1/1671; H04L 5/001; H04L 5/0053; H04B 7/088; H04B 7/0695
See application file for complete search history.

(56) References Cited

U.S. PATENT DOCUMENTS

| | | | | |
|---|---|---|---|---|
| 2020/0322035 | A1* | 10/2020 | Shi | H04L 5/0048 |
| 2020/0350973 | A1* | 11/2020 | Cirik | H04B 7/0695 |
| 2021/0013948 | A1* | 1/2021 | Agiwal | H04B 17/17 |
| 2021/0013949 | A1* | 1/2021 | Agiwal | H04B 7/0695 |
| 2021/0058998 | A1* | 2/2021 | Yuan | H04W 76/19 |
| 2021/0409091 | A1* | 12/2021 | Svedman | H04L 5/0051 |
| 2022/0052749 | A1* | 2/2022 | Guo | H04L 5/0051 |
| 2022/0070853 | A1* | 3/2022 | Guo | H04W 72/046 |

FOREIGN PATENT DOCUMENTS

| | | | | |
|---|---|---|---|---|
| WO | 2019174036 | A1 | 9/2019 | |
| WO | WO-2020223649 | A1 * | 11/2020 | H04B 7/0695 |

OTHER PUBLICATIONS

Huawei., et al., "Beam Failure Recovery for SCell", 3GPP Draft, 3GPP TSG RAN WG1 Meeting #94bis, R1-1810106, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 29, 2018 (Sep. 29, 2018), XP051517521, 6 Pages, Retrieved from the Internet: URL: http://www.3gpp.org/ftp/tsg%5Fran/WG 1%5FRL1/TSGR1%5F94b/Docs/R1%2D1810106%2Ezip. [retrieved on Sep. 29, 2018].

Huawei., et al., "Enhancements on Multi-Beam Operation", 3GPP Draft, 3GPP TSG RAN WG1 Meeting #98, R1-1908067, 3RD Generation Partnership Project (3GPP), Mobile Competence Centre, 650, Route Des Lucioles, F-06921 Sophia-Antipolis, France, vol. RAN WG1, No. Prague, Czech Republic, Aug. 26, 2019-Aug. 30, 2019, Aug. 17, 2019 (Aug. 17, 2019), XP051764690, 20 Pages, Retrieved from the Internet: URL:http://www.3gpp.org/ftp/tsg_ran/WG1_RL/TSGR1_98/Docs/R1-1908067.zip [retrieved on Aug. 17, 2019] the whole document.

International Search Report and Written Opinion—PCT/US2020/055163—ISA/EPO—dated Jan. 22, 2021.

Qualcomm Incorporated: "Enhancements on Multi-Beam Operation", 3GPP Draft, R1-1911127, 3GPP TSG-RAN WG1 Meeting #98, Enhancements on Multi-Beam Operation, 3RD Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 5, 2019, XP051808850, 22 Pages, https://ftp.3gpp.org/tsg_ran/WG1_RL1/TSGR1_98b/Docs/R1-1911127.zip, R1-1911127 Enhancements on Multi-beam Operation.docx.

* cited by examiner

BEAM FAILURE RECOVERY RESPONSE

CROSS-REFERENCE TO RELATED APPLICATION(S)

This application claims benefit of and priority to U.S. Provisional Application No. 62/914,398, filed Oct. 11, 2019, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for managing beam failure recovery operations.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation (CA).

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved beam failure detection.

Certain aspects relate to a method for wireless communication by a user equipment (UE). The method includes performing beam failure detection (BFD) of a beam pair link (BPL) associated with a secondary cell (Scell) of a base station (BS); sending a beam failure recovery request (BFRQ) message in another cell of the BS, the BFRQ message including an indication of a candidate recovery beam for the Scell; starting a timer based on sending the BFRQ; determining whether to resend the BFRQ message in the other cell based on whether a beam failure recovery response (BFRR) message is received in the other cell prior to expiration of the timer; and resending the BFRQ message in the other cell based on the determining, wherein the BFRR message comprises one or more of the following types: a new transmission configuration indicator (TCI) state activation or reconfiguration for the Scell, a transmission using the candidate recovery beam for the Scell, or a deactivation command for the Scell.

Certain aspects relate to a method for wireless communication by a base station (BS). The method includes receiving a beam failure recovery request (BFRQ) message in a cell from a user equipment (UE), the BFRQ message including an indication of a candidate recovery beam for a secondary cell (Scell) of the UE; and sending a beam failure recovery response (BFRR) message to the UE in response to the BFRQ message, wherein the BFRR message comprises one or more of the following types: a new transmission configuration indicator (TCI) state activation or reconfiguration for the Scell, a transmission using the candidate recovery beam for the Scell, or a deactivation command for the Scell.

Certain aspects relate to a user equipment (UE), comprising a memory and a processor communicatively coupled to the memory. The processor is configured to perform beam failure detection (BFD) of a beam pair link (BPL) associated with a secondary cell (Scell) of a base station (BS). The processor is configured to send a beam failure recovery request (BFRQ) message in another cell of the BS, the BFRQ message including an indication of a candidate recovery beam for the Scell. The processor is configured to start a timer based on sending the BFRQ. The processor is configured to determine whether to resend the BFRQ message in the other cell based on whether a beam failure recovery response (BFRR) message is received in the other cell prior to expiration of the timer. The processor is configured to resend the BFRQ message in the other cell based on the determination, wherein the BFRR message comprises one or more of the following types: a new transmission configuration indicator (TCI) state activation or reconfiguration for the Scell, a transmission using the candidate recovery beam for the Scell; or a deactivation command for the Scell.

Certain aspects relate to a base station (BS), comprising a memory and a processor communicatively coupled to the memory. The processor is configured to receive a beam failure recovery request (BFRQ) message in a cell from a user equipment (UE), the BFRQ message including an indication of a candidate recovery beam for a secondary cell (Scell) of the UE. The processor is configured to send a beam failure recovery response (BFRR) message to the UE in response to the BFRQ message, wherein the BFRR message comprises one or more of the following types: a new transmission configuration indicator (TCI) state activation or reconfiguration for the Scell; a transmission using the candidate recovery beam for the Scell; or a deactivation command for the Scell.

Certain aspects relate to a user equipment (UE). The UE includes means for performing beam failure detection (BFD) of a beam pair link (BPL) associated with a secondary cell (Scell) of a base station (BS). The UE includes means for sending a beam failure recovery request (BFRQ) message in another cell of the BS, the BFRQ message including an indication of a candidate recovery beam for the Scell. The UE includes means for starting a timer based on sending the BFRQ. The UE includes means for determining whether to resend the BFRQ message in the other cell based on whether a beam failure recovery response (BFRR) message is received in the other cell prior to expiration of the timer. The UE includes means for resending the BFRQ message in the other cell based on the determining, wherein the BFRR message comprises one or more of the following types: a new transmission configuration indicator (TCI) state activation or reconfiguration for the Scell; a transmission using the candidate recovery beam for the Scell; or a deactivation command for the Scell.

Certain aspects relate to a base station (BS). The BS includes, means for receiving a beam failure recovery request (BFRQ) message in a cell from a user equipment (UE), the BFRQ message including an indication of a candidate recovery beam for a secondary cell (Scell) of the UE. The BS includes, means for sending a beam failure recovery response (BFRR) message to the UE in response to the BFRQ message, wherein the BFRR message comprises one or more of the following types: a new transmission configuration indicator (TCI) state activation or reconfiguration for the Scell; a transmission using the candidate recovery beam for the Scell; or a deactivation command for the Scell.

Certain aspects relate to a non-transitory computer-readable storage medium having instructions stored thereon for wireless communication by a user equipment (UE). The instructions are configured to perform beam failure detection (BFD) of a beam pair link (BPL) associated with a secondary cell (Scell) of a base station (BS). The instructions are configured to send a beam failure recovery request (BFRQ) message in another cell of the BS, the BFRQ message including an indication of a candidate recovery beam for the Scell. The instructions are configured to start a timer based on sending the BFRQ. The instructions are configured to determine whether to resend the BFRQ message in the other cell based on whether a beam failure recovery response (BFRR) message is received in the other cell prior to expiration of the timer. The instructions are configured to resend the BFRQ message in the other cell based on the determination, wherein the BFRR message comprises one or more of the following types: a new transmission configuration indicator (TCI) state activation or reconfiguration for the Scell; a transmission using the candidate recovery beam for the Scell; or a deactivation command for the Scell.

Certain aspects relate to a non-transitory computer-readable storage medium having instructions stored thereon for wireless communication by a base station (BS). The instructions are configured to receive a beam failure recovery request (BFRQ) message in a cell from a user equipment (UE), the BFRQ message including an indication of a candidate recovery beam for a secondary cell (Scell) of the UE. The instructions are configured to send a beam failure recovery response (BFRR) message to the UE in response to the BFRQ message, wherein the BFRR message comprises one or more of the following types: a new transmission configuration indicator (TCI) state activation or reconfiguration for the Scell; a transmission using the candidate recovery beam for the Scell; or a deactivation command for the Scell.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
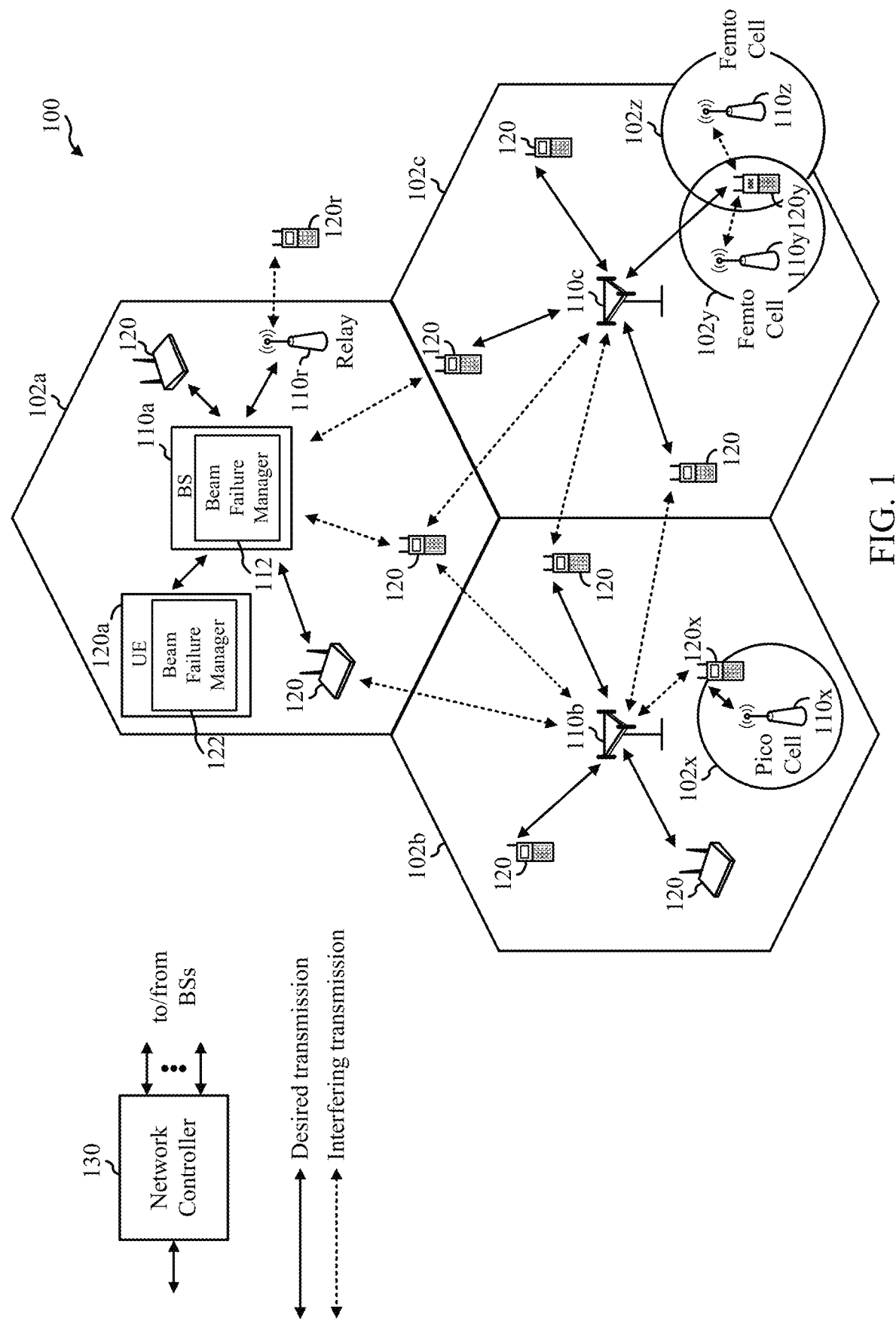
FIG. 1 is a block diagram conceptually illustrating an example telecommunications system, in accordance with certain aspects of the present disclosure.

Aspects of the present disclosure provide apparatus, methods, processing systems, and computer readable mediums for managing beam failure detection. In certain wireless communication systems (e.g., 5G NR), a user equipment (UE) may communicate with a base station (BS) via multiple cells (e.g., a primary cell (Pcell) using primary component carriers (PCCs), and at least one secondary cell (Scell) using secondary component carriers (SCCs)) using carrier aggregation (CA) of the PCCs and SCCs. That is, the multiple cells are aggregated together to allow the BS to serve the UE. Generally, the Pcell may perform random access (RA) procedures, radio link monitoring (RLM), handover procedures, etc. In some examples, the Scell may provide downlink only, or both downlink and uplink. The BS may perform activation and deactivation of the Scell by MAC signaling with the UE. By using MAC signaling, the BS may change the activation/deactivation status of the Scell in accordance with data activity.

Aspects of the present disclosure relate to beam failure detection and recovery. In some systems, narrow-beam transmission and reception is useful for improving the link budget at millimeter-wave (mmW) frequencies but may be susceptible to beam failure. In mmW, direction beamforming is used between the UE and a BS, and the UE and BS communicate via a beam pair link (BPL). A beam failure generally refers to a scenario in which the quality of a beam falls below a threshold (e.g., reference signal received power (RSRP) of the BPL falls below a threshold), which may lead to radio link failure (RLF). NR supports a lower layer signaling to recover from beam failure, referred to as beam recovery. For example, instead of initiating a cell reselection when a beam quality becomes too low, a beam pair reselection within the cell may be performed. In some examples, the UE may detect the beam failure and transmit a beam failure recovery request (BFRQ) to the base station.

In certain aspects, a beam failure recovery (BFR) process can be cell-specific (e.g., a BFR process associated with the Pcell and a BFR associated with the Scell). In one example, a UE can communicate a BFRQ intended for an Scell by transmitting the BFRQ to the Pcell via PUCCH as a dedicated scheduling request. For example, a beam failure recovery response (BFRR) by the base station to the UE's BFRQ may include an uplink grant to schedule a new transmission for a hybrid automatic repeat request (HARQ).

The following description provides examples of beam failure detection and response in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network).

As shown in FIG. 1, the BS 110a includes a beam failure manager 112 configured to receive a beam failure recovery request (BFRQ) message in a cell from a user equipment (UE), the BFRQ message including an indication of a candidate recovery beam for a secondary cell (Scell) of the UE. The beam failure manager 112 may also be configured to send a beam failure recovery response (BFRR) message to the UE in response to the BFRQ message, wherein the BFRR message comprises one or more of the following types: a new transmission configuration indicator (TCI) state activation or reconfiguration for the Scell, a transmission using the candidate recovery beam for the Scell, or a deactivation command for the Scell.

The UE 120a includes a beam failure manager 122 configured to perform beam failure detection (BFD) of a beam pair link (BPL) associated with a secondary cell (Scell) of a base station (BS) (e.g., in CA). The beam failure manager 122 may also be configured to send a beam failure recovery request (BFRQ) message in another cell, the BFRQ message including an indication of a candidate recovery beam for the Scell. The beam failure manager 122 may also be configured to start a timer based on sending the BFRQ. The beam failure manager 122 may also be configured to determine whether to resend the BFRQ message in the other cell based on whether a beam failure recovery response (BFRR) message is received in the other cell prior to expiration of the timer. The beam failure manager 122 may also be configured to resend the BFRQ message in the other cell based on the determining, wherein the BFRR message comprises one or more of the following types: a new transmission configuration indicator (TCI) state activation or reconfiguration for the Scell, a transmission using the candidate recovery beam for the Scell, or a deactivation command for the Scell.

NR access (e.g., 5G NR) may support various wireless communication services, such as enhanced mobile broadband (eMBB) targeting wide bandwidth (e.g., 80 MHz or beyond), millimeter wave (mmWave) targeting high carrier frequency (e.g., 25 GHz or beyond), massive machine type communications MTC (mMTC) targeting non-backward compatible MTC techniques, and/or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
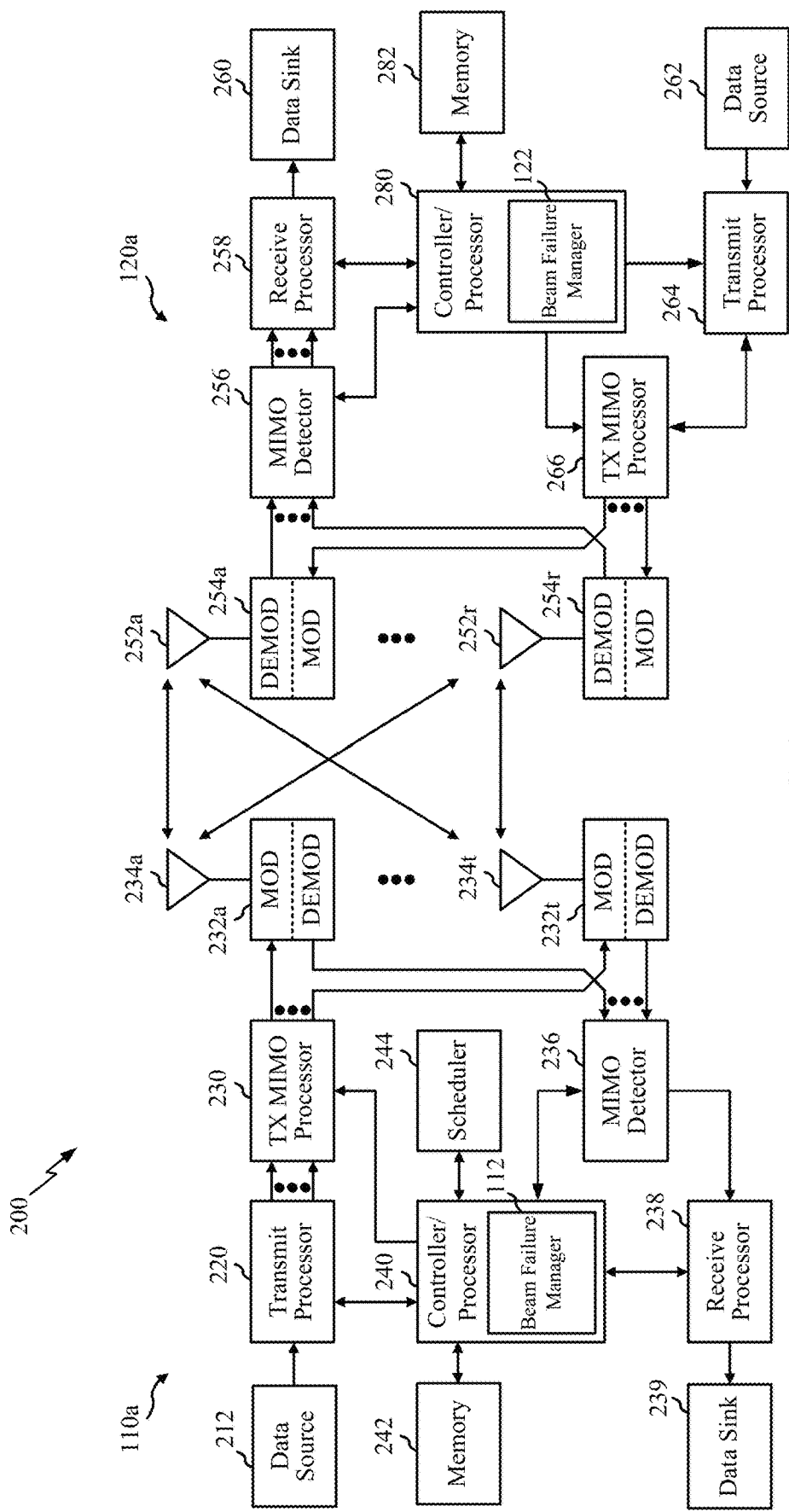
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and PBCH demodulation reference signal (DMRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein.

For example, as shown in FIG. 2, the controller/processor 240 of the BS 110a has a beam failure manager 112 configured to receive a beam failure recovery request (BFRQ) message in a cell from a user equipment (UE), the BFRQ message including an indication of a candidate recovery beam for a secondary cell (Scell) of the UE. The beam failure manager 112 may also be configured to send a beam failure recovery response (BFRR) message to the UE in response to the BFRQ message, wherein the BFRR message comprises one or more of the following types: a new transmission configuration indicator (TCI) state activation or reconfiguration for the Scell, a transmission using the candidate recovery beam for the Scell, or a deactivation command for the Scell.

The UE 120a includes a beam failure manager 122 configured to perform beam failure detection (BFD) of a beam pair link (BPL) associated with a secondary cell (Scell) of a BS (e.g., in CA). The beam failure manager 122 may also be configured to send a beam failure recovery request (BFRQ) message in another cell, the BFRQ message including an indication of a candidate recovery beam for the Scell. The beam failure manager 122 may also be configured to start a timer based on sending the BFRQ. The beam failure manager 122 may also be configured to determine whether to resend the BFRQ message in the other cell based on whether a beam failure recovery response (BFRR) message is received in the other cell prior to expiration of the timer. The beam failure manager 122 may also be configured to resend the BFRQ message in the other cell based on the determining, wherein the BFRR message comprises one or more of the following types: a new transmission configuration indicator (TCI) state activation or reconfiguration for the Scell, a transmission using the candidate recovery beam for the Scell, or a deactivation command for the Scell.

Example Beam Failure Recovery for a Secondary Cell

In wireless communication systems (e.g., 5G NR), a UE 120a may communicate with a BS 110a via multiple cells (e.g., a primary cell (Pcell) and at least one secondary cell (Scell)) using multiple component carriers (CCs), which may be referred to as carrier aggregation (CA). In certain cases, the UE 120a may only receive downlink transmissions (e.g., data transmissions) via the Scell. For example, the UE 120a may receive downlink control signaling from the Pcell (e.g., scheduling resource grants, radio resource control (RRC) signaling, downlink control information (DCI)) on a control resource set (CORESET) of a PDCCH, and receive only downlink data transmissions from the Scell (e.g., communications between the UE 120a and the Scell may be configured without a CORESET for the UE 120a to receive control signaling). The UE 120a may communicate with one or more of the Pcell and the Scell via uplink transmissions.

In some cases, CA may be used to increase the bandwidth of communications between the UE 120a and BS 110a. In the case of beamformed communication systems (5G NR), CA may also enable the use of different beams for various traffic flows, such as wide beams for broadcast control signaling or narrow beams for UE-specific data traffic.

Narrow-beam transmission and reception is useful for improving the link budget at millimeter-wave frequencies but may be susceptible to beam failure. A beam failure generally refers to a scenario in which the quality of a beam for control resource sets (CORESETs) falls below a threshold, which may lead to radio link failure (RLF). NR supports a lower layer signaling process for recovery from beam failure, referred to as beam failure recovery (BFR) process. For example, instead of initiating a cell reselection when a beam quality becomes too low, a beam pair reselection within the cell may be performed.

Also, in some cases, receiving a BFRR message from a BS can be delayed if, for example, a UE is receiving more downlink traffic than uplink traffic or the BS scheduling causes a delay in an uplink grant being provided to the UE. A delay in receiving the BFRR may cause additional delays in generating and communicating, by the BS, instructions regarding the failed Scell, and establishing a new link and resuming Scell communication. Thus, as described below are methods and techniques for reducing or eliminating communication delays caused by a failed Scell. For example, the UE may communicate a candidate beam for Scell recovery in a BFRQ message, and a BFRR transmission in response to the UE may serve as not only an ACK, but also as an UL grant for a new transmission for the UE to the Scell, where the BFRR transmission has the same HARQ ID as the BFRQ.

Figure 3:
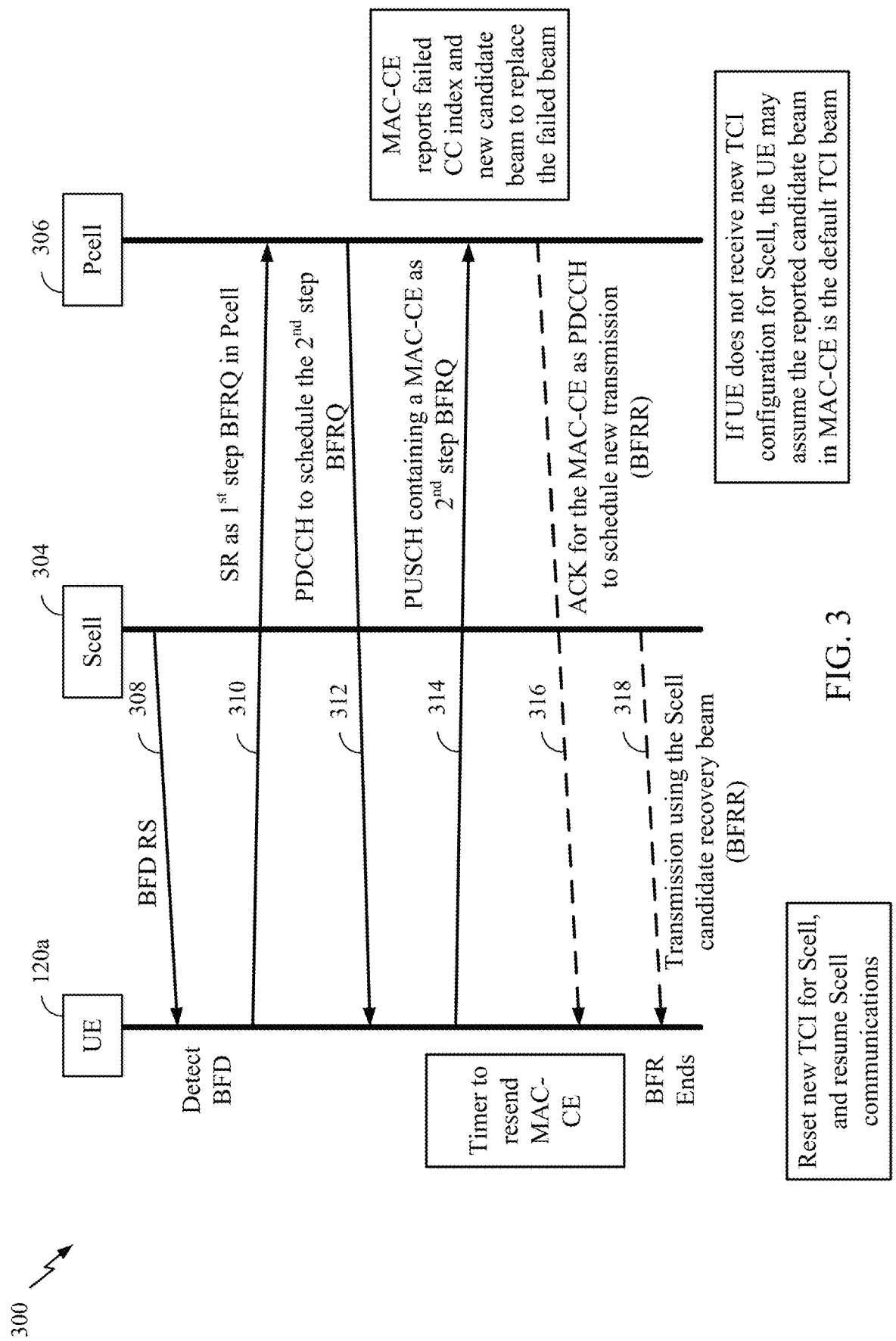
FIG. 3 is an example beam failure detection and recovery procedure, in accordance with certain aspects of the present disclosure.

FIG. 3 is a call flow illustrating example operations 300 for beam failure detection (BFD) and BFR, in accordance with certain aspects of the present disclosure. As shown, the UE 120a is configured to perform BFD for a beam pair link (BPL) associated with a secondary cell (Scell) with at least two cells (e.g., in CA): an Scell 304 and a Pcell 306 (note that in some embodiments, the Pcell 306 may instead be another Scell).

Beam failure may be detected by monitoring a BFD reference signal (RS) and assessing if a beam failure trigger condition has been met. As shown in FIG. 3, the UE 120a monitors for the BFD RS from the Scell 304, and receives the BFD RS in a first communication 308. In some examples, the UE 120a detects beam failure if an estimated block error rate (BLER) of an RS associated with a configured control resource set (CORESET) is above a threshold value (e.g., 10%). In some examples, the UE 120a detects beam failure when the UE 120a determines that the reference signal receive power (RSRP) of a BPL is below a threshold value.

To recover the Scell 304, the UE 120a can send a beam failure request (BFRQ) message on another cell. The BFRQ may be sent to the Pcell 306 as shown in FIG. 3, or to another Scell (not shown). A two-step BFRQ may be used. For example, after detecting beam failure, the UE 120a may send the first step (or first stage) of the BFRQ in a second communication 310 on the Pcell 306. The first step of the BFRQ message may include a scheduling request (SR) on the Pcell 306. In some examples, the SR may be sent on dedicated SR resources. The SR may request scheduling for the UE 120a to communicate the second step (or second stage) of the BFRQ message.

As shown in FIG. 3, in a third communication 312, the UE 120a may receive a PDCCH from the Pcell 306, in response to the SR, scheduling the UE 120a for communication of the second step of the BFRQ message. In some examples, the PDCCH communication may include HARQ information comprising one or more of a new data indicator (NDI), and a HARQ process ID identifying the particular HARQ process between the UE 120a and the Pcell 306 for the second step BFRQ message of FIG. 3.

In response to the PDCCH, the UE 120a may send the scheduled second step of the BFRQ message in a fourth communication 314 on the Pcell 306. In some examples, the fourth communication 314 may include a MAC-CE transmitted over a PUSCH as scheduled by the Pcell 306. The MAC-CE may include an identifier (e.g., an index corresponding to a beam or beam pair) of the failed component carrier (CC) (e.g., the beam or beam pair), and/or an indication of a candidate beam of the Scell 304 for recovery. As such, the UE 120a uses the MAC-CE to report both a failed CC index as well as a new candidate beam to replace the failed beam.

To find candidate new beams, the UE 120a may monitor for a beam identification RS. For example, once a beam failure has been detected by the UE 120a, the UE 120a may identify a new candidate beam by monitoring for a beam identification RS and selecting a beam having good reception quality based on the measured reception quality. The RS for new beam identification may include a channel state information-reference signal (CSI-RS) and/or a synchronization signal (SS) block. For example, the UE 120a may monitor for a candidate new beam transmitted by the Scell 304 prior to, during, or after BFD.

In certain aspects, the UE 120a may initiate a timer upon transmission of the BFRQ or upon determination to send the BFRQ. For example, the UE 120a may start a timer upon sending the first step or the second step of the BFRQ. In some examples, the UE 120a may determine whether to resend the first step or the second step of the BFRQ message to the Pcell 306 based on whether a BFRR message is received from the other cell prior to expiration of the timer. For example, if a duration of the timer expires and the UE 120a has not received a BFRR, the UE 120a may resend the first step or the second step of the BFRQ message. In some examples, if the UE 120a has already retransmitted the first step or the second step of the BFRQ message a threshold number of retransmissions, the UE 120a may refrain from resending the BFRQ message to the Pcell 306. Instead, if the UE 120a cannot detect any response after the threshold number of retransmissions, then the UE 120a may notify higher layers (e.g., core network), potentially leading to RLF and cell reselection.

The BFRR message may be transmitted to the UE 120a in one of two ways. In a fifth communication 316, the Pcell 306 responds to the second step of the BFRQ by transmitting a beam failure recovery response (BFRR) message to the UE 120a. The BFRR message may acknowledge the MAC-CE and include an uplink grant (e.g., downlink control information (DCI) message) scheduling a new uplink transmission by the UE 120a. In some examples, the uplink grant may schedule the new uplink transmission using the same HARQ process ID that was used in the PUSCH carrying the MAC-CE in the second step of the BFRQ and identified by the Pcell 306 in the third communication 312. In some examples, the BFRR is sent over a CORESET (e.g., referred to as a CORESET-BFR) the UE 120a monitors for response from the Pcell 306. As an alternative to the fifth communication 316, a sixth communication 318 may be transmitted from the Scell 304. The sixth communication 318 may be a transmission using the Scell candidate recovery beam identified by the MAC-CE.

In certain aspects, the BFRR message comprises one or more of the following: (i) a new transmission configuration indicator (TCI) state activation or reconfiguration for the Scell 304 provided to the UE 120a by the Pcell 306 or another cell, (ii) a transmission to the UE 120a from the Scell 304 using the candidate recovery beam for the Scell 304, or (iii) a deactivation command for the Scell 304 provided to the IE 120a by the Pcell 306 or another cell.

The new TCI may include, among other things, information about a reference signal (RS) (e.g., a CSI-RS and/or an SS block). Here, the Pcell 306, by providing the UE 120a with the new TCI state, associates the new TCI state with the RS transmitted by the Scell 304 (e.g., the RS used by the UE 120a for BFD in the first communication 308). Thus, the Pcell informs the UE 120a that it can assume that the RS transmitted by the Scell 304 uses the same spatial filter associated with that TCI. In some examples, the BFRR message may include the new TCI state as part of the scheduling assignment that indicates to the UE 120a the quasi-colocation (QCL) relationships to use (e.g., which receive beams the UE 120a can use) to receive the RS transmitted by the Scell 304. Accordingly, the UE 120a may reset the TCI state with the Scell 304 using the new TCI state, and resume Scell 304 communications. Thus, because the BFRR message includes the new TCI state, the UE 120a can directly use the new TCI for communication with the Scell 304, saving latency and overhead. Without the new TCI state in the BFRR message, the UE 120a would need to wait for additional signaling from the Pcell 306 to reset TCI of Scell 304, then communicate that data to the UE 120a.

As discussed, the BFRR message may be transmitted to the UE 120a by the Scell 304 using a candidate recovery beam indicated by the UE 120a in the fourth communication 314. That is, the Scell 304 may transmit the BFRR message to the UE 120a using the candidate beam for the Scell 304 identified by the UE 120a in the MAC-CE. In some examples, the BFRR message is a PDCCH transmitted over a predefined resource using the candidate recovery beam. In this example, after transmitting the MAC-CE of the fourth communication 314, the UE 120a monitors the predefined resource and candidate recovery beam for a duration of time (e.g., a predetermined duration of time of a timer) after transmitting the MAC-CE. If the UE 120a does not receive the BFRR message within the duration of the timer, the UE 120a may retransmit the first step (or first stage) of the BFRQ of the second communication 310. After receiving the BFRR within the duration of the timer, the UE may stop the timer and refrain from retransmitting the BFRQ of the second communication 310.

In some examples, the predefined PDCCH resource may be defined in wireless communication standards (e.g., 3GPP) that direct communications of the UE 120a, the Scell 304, and the Pcell 306. In some examples, the predefined PDCCH resource may be defined by signaling prior to the BFR. For example, certain tones in certain symbols may be candidates for a PDCCH search space, where those tones and symbols are defined in the wireless communication standards. In this example, the UE 120a may use blind decoding of the potential PDCCH in those candidate search spaces. Note that in a search space, there may be multiple candidate locations the PDCCH will be transmitted: thus, the UE 120a may blind decode all candidate locations. If the UE 120a determines that the scrambling sequence of the CRC in the decoded location matches UE's own sequence, then UE 120a has detected the PDCCH.

The UE 120a may reset the TCI state with the Scell 304 using the TCI state of the candidate beam, and resume Scell 304 communications. Alternatively, if the UE 120a does not receive a new TCI state or a BFRR message, the UE 120a may assume that the candidate beam indicated in the MAC-CE is the new TCI state for a receive beam that the UE 120a can use to receive signaling from the Scell 304. Thus, the UE 120a may reset its TCI state for the Scell 304 using the TCI state of the candidate beam to resume Scell 304 communications.

In some examples, the BFRR message may include a deactivation command for the Scell 304. In CA, activation and deactivation of a CC (e.g., a CC of the Scell 304) can be done through MAC-CE signaling. For example, the MAC-CE signaling may include a bitmap where each bit indicates whether the Scell 304 should be activated or deactivated. The deactivation command may be transmitted to the UE 120a by the Pcell 306 on a PDSCH. Here, the UE 120a can assume that all communications between the UE 120a and the Scell 304 will cease until the UE 120a is explicitly notified of reactivation of the Scell 304. In some examples, the base station 110 may perform deactivation of the Scell 304

Figure 4:
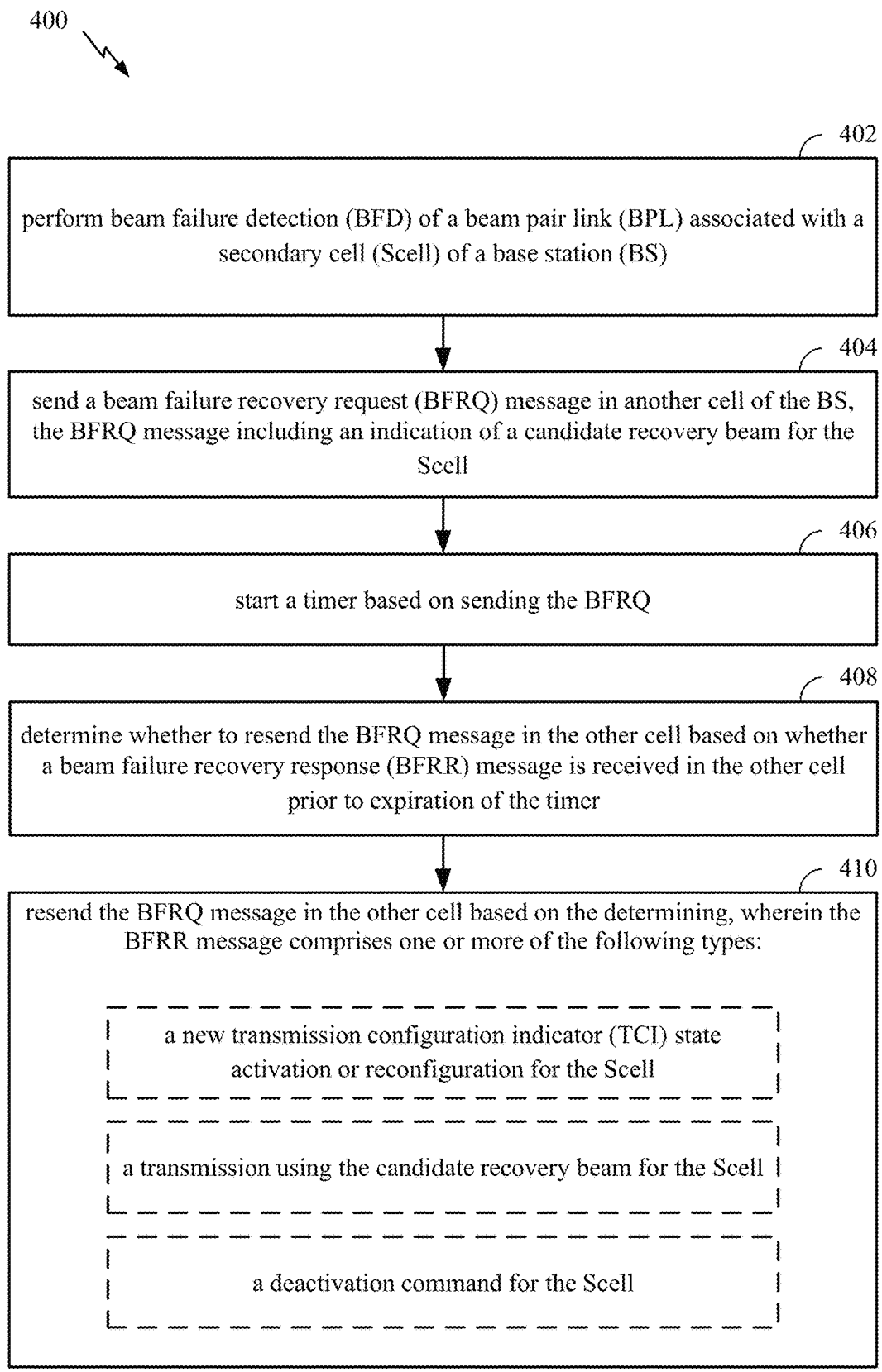
FIG. 4 is a flow diagram illustrating example operations for wireless communication by a UE, in accordance with certain aspects of the present disclosure.

FIG. 4 is a flow diagram illustrating example operations 400 for wireless communication, in accordance with certain aspects of the present disclosure. The operations 400 may be performed, for example, by UE (e.g., the UE 120*a* in the wireless communication network 100). Operations 400 may be implemented as software components that are executed and run on one or more processors (e.g., controller/processor 280 of FIG. 2). Further, the transmission and reception of signals by the UE in operations 400 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 400 begin at block 402, by performing beam failure detection (BFD) of a beam pair link (BPL) associated with a secondary cell (Scell) of a base station (BS) (e.g., in carrier aggregation (CA)).

The operations 400 proceed to block 404, by sending a beam failure recovery request (BFRQ) message in another cell of the BS, the BFRQ message including an indication of a candidate recovery beam for the Scell.

The operations 400 proceed to block 406, by starting a timer based on sending the BFRQ.

The operations 400 proceed to block 408, by determining whether to resend the BFRQ message in the other cell based on whether a beam failure recovery response (BFRR) message is received in the other cell prior to expiration of the timer, and The operations 400 proceed to block 410 by resending the BFRQ message (or refraining from resending the BFRQ message) in the other cell based on the determining, wherein the BFRR message comprises one or more of the following types: (i) a new transmission configuration indicator (TCI) state activation or reconfiguration for the Scell, (ii) a transmission using the candidate recovery beam for the Scell, or (iii) a deactivation command for the Scell.

In certain aspects, the BFRR message further comprises an uplink grant for a new transmission with a same hybrid automatic repeat request (HARQ) process as an uplink channel carrying the BFRQ message.

In certain aspects, the other cell is a primary cell.

In certain aspects, the new TCI state activation or reconfiguration for the Scell is received in a media access control (MAC) control element (CE) on a physical downlink shared channel (PDSCH) in the other cell.

In certain aspects, the new TCI state activation or reconfiguration for the Scell is received in the other cell. For example, the new TCI state activation or reconfiguration for the Scell may be received in a media access control (MAC) control element (CE) on a physical downlink shared channel (PDSCH) in the other cell.

In certain aspects, the transmission using the candidate recovery beam for the Scell is a physical downlink control channel (PDCCH).

In certain aspects, the transmission using the candidate recovery beam for the Scell is sent in a predefined resource.

In certain aspects, the predefined resource comprises one or more frequency and time resources.

In certain aspects, the transmission using the candidate recovery beam for the Scell is sent in a resource indicated to the UE.

In certain aspects, the resource is indicated to the UE using radio resource control (RRC) signaling.

In certain aspects, the operations 400 include monitoring a resource for the transmission using the candidate recovery beam for the Scell for a time period after sending the BFRQ message.

In certain aspects, the time period is indicated to the UE.

In certain aspects, the time period is indicated to the UE using radio resource control (RRC) signaling.

In certain aspects, monitoring comprises setting a receive beam of the UE to receive the candidate recovery beam for the Scell.

In certain aspects, the time period is based on UE capability of the UE.

In certain aspects, the deactivation command is received in a media access control (MAC) control element (CE) on a physical downlink shared channel (PDSCH) in the other cell.

In certain aspects, the deactivation command is received in the other cell. For example, the deactivation command may be received in a media access control (MAC) control element (CE) on a physical downlink shared channel (PDSCH) in the other cell.

In certain aspects, the operations 400 include receiving an indication of which one or more types of BFRR messages to monitor for.

In certain aspects, the operations 400 include monitoring for BFRR messages of the indicated one or more types.

In certain aspects, the operations 400 include determining one or more receive beams to use for monitoring based on the indicated one or more types.

In certain aspects, the operations 400 include receiving the BFRR message, wherein the BFRR message comprises the deactivation command for the Scell, and deactivating the Scell based on receiving the BFRR message.

In certain aspects, the operations 400 include receiving the BFRR message, wherein the BFRR message comprises the new TCI state activation or reconfiguration for the Scell, and resetting a TCI state of the Scell to the new TCI state based on receiving the BFRR message.

In certain aspects, the operations 400 include receiving the BFRR message, wherein the BFRR message comprises the uplink grant, and resetting a TCI state of the Scell as the candidate recovery beam based on receiving the BFRR message.

In certain aspects, the new TCI state activation or reconfiguration for the Scell is the candidate recovery beam for the Scell.

Figure 5:
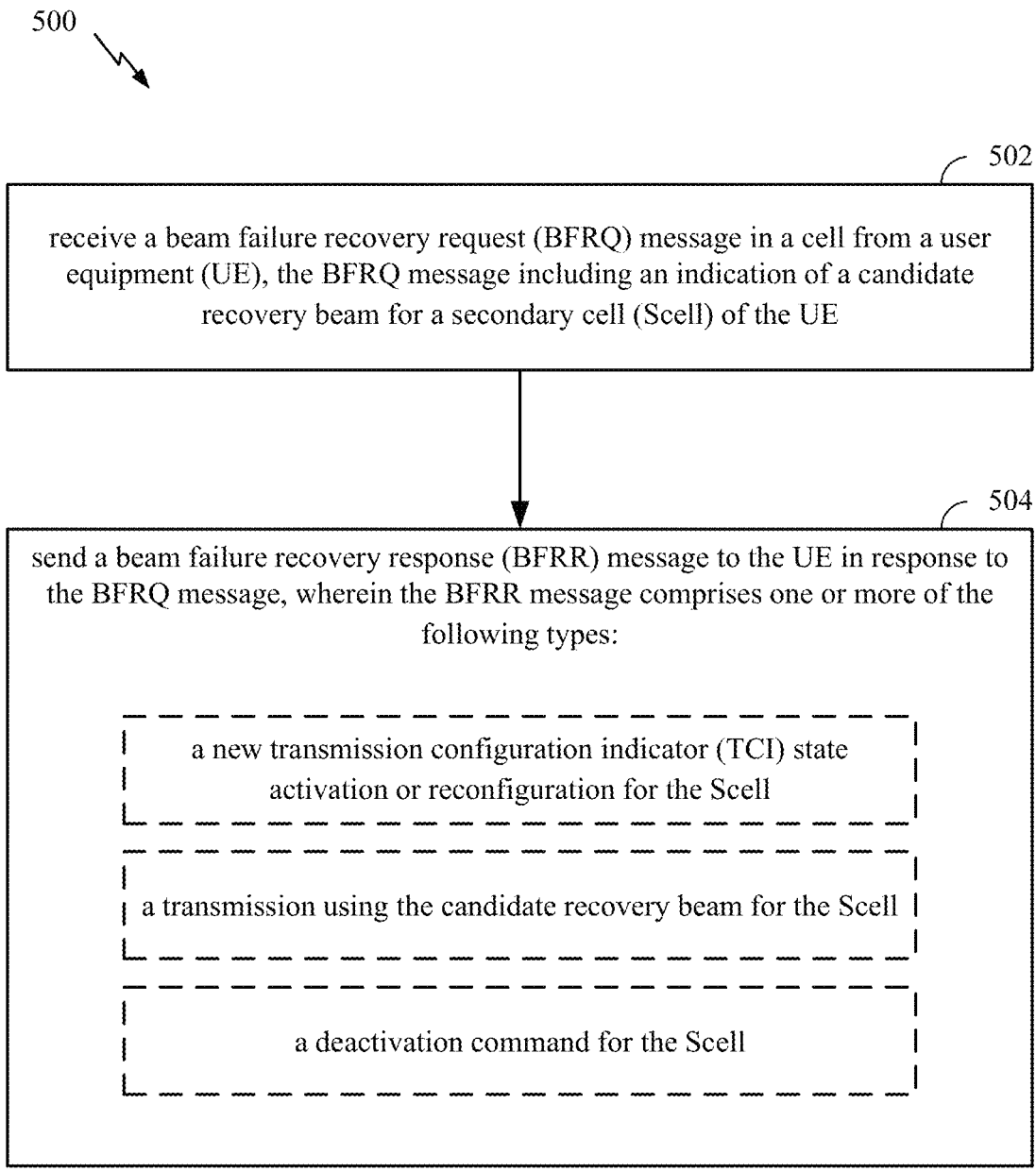
FIG. 5 is a flow diagram illustrating example operations for wireless communication by a BS, in accordance with certain aspects of the present disclosure.

FIG. 5 is a flow diagram illustrating example operations 500 for wireless communication, in accordance with certain aspects of the present disclosure. The operations 500 may be performed, for example, by a base station (e.g., the BS 110*a* in the wireless communication network 100). The operations 500 may be complimentary to the operations 400 performed by the UE. Operations 500 may be implemented as software components that are executed and run on one or more processors (e.g., controller/processor 240 of FIG. 2). Further, the transmission and reception of signals by the BS in operations 500 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 500 begin at block 502, by receiving a beam failure recovery request (BFRQ) message in a cell from a user equipment (UE), the BFRQ message including an indication of a candidate recovery beam for a secondary cell (Scell) of the UE.

The operations proceed to block 504 by sending a beam failure recovery response (BFRR) message to the UE in response to the BFRQ message, wherein the BFRR message comprises one or more of the following types: (i) a new transmission configuration indicator (TCI) state activation or reconfiguration for the Scell, (ii) a transmission using the candidate recovery beam for the Scell, or (iii) a deactivation command for the Scell.

In certain aspects, the BFRR message further comprises an uplink grant for a new transmission with a same hybrid automatic repeat request (HARM) process as an uplink channel carrying the BFRQ message.

In certain aspects, the cell is a primary cell.

In certain aspects, the new TCI state activation or reconfiguration for the Scell is transmitted in a media access control (MAC) control element (CE) on a physical downlink shared channel (PDSCH) in the cell.

In certain aspects, the new TCI state activation or reconfiguration for the Scell is transmitted in the cell. For example, the new TCI state activation or reconfiguration for the Scell may be transmitted in a media access control (MAC) control element (CE) on a physical downlink shared channel (PDSCH) in the cell.

In certain aspects, the transmission using the candidate recovery beam for the Scell is a physical downlink control channel (PDCCH).

In certain aspects, the transmission using the candidate recovery beam for the Scell is sent in a predefined resource.

In certain aspects, the predefined resource comprises one or more frequency and time resources.

In certain aspects, the transmission using the candidate recovery beam for the Scell is sent in a resource indicated to the UE.

In certain aspects, the resource is indicated to the UE using radio resource control (RRC) signaling.

In certain aspects, the deactivation command is transmitted in a media access control (MAC) control element (CE) on a physical downlink shared channel (PDSCH) in the cell.

In certain aspects, the deactivation command is transmitted in the cell.

In certain aspects, the operations 500 include transmitting to the UE an indication of which one or more types of BFRR messages to monitor for.

In certain aspects, the new TCI state activation or reconfiguration for the Scell is the candidate recovery beam for the Scell.

Figure 6:
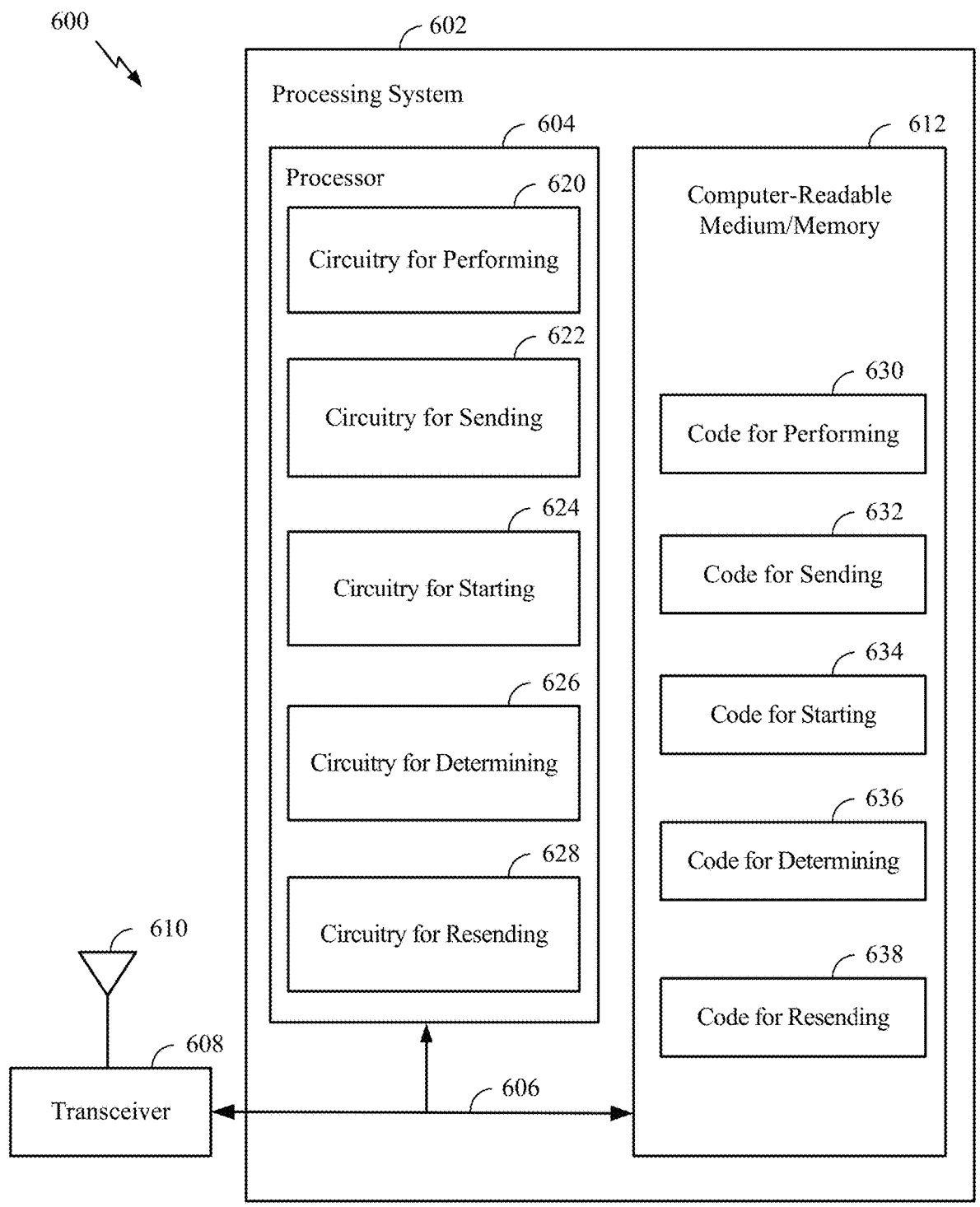
FIG. 6 illustrates a communications device that may include various components configured to perform operations for the techniques disclosed herein in accordance with aspects of the present disclosure.

FIG. 6 illustrates a communications device 600 (e.g., the UE 120a) that may include various components (e.g., corresponding to means-plus-function components) configured to perform operations for the techniques disclosed herein, such as the operations illustrated in FIG. 4. The communications device 600 includes a processing system 602 coupled to a transceiver 608 (e.g., a transmitter and/or receiver). The transceiver 608 is configured to transmit and receive signals for the communications device 600 via an antenna 610, such as the various signals as described herein. The processing system 602 may be configured to perform processing functions for the communications device 600, including processing signals received and/or to be transmitted by the communications device 600.

The processing system 602 includes a processor 604 coupled to a computer-readable medium/memory 612 via a bus 606. In certain aspects, the computer-readable medium/memory 612 is configured to store instructions (e.g., computer-executable code) that when executed by the processor 604, cause the processor 604 to perform the operations illustrated in FIG. 4, or other operations for performing the various techniques discussed herein for beam failure recovery. In certain aspects, computer-readable medium/memory 612 stores code 630 for performing BFD of a BPL associated with an Scell of a BS in CA; code 632 for sending a BFRQ message in another cell of the BS, the BFRQ message including an indication of a candidate recovery beam for the Scell; code 634 for starting a timer based on sending the BFRQ; code 636 determining whether to resend the BFRQ message in the other cell based on whether a BFRR message is received in the other cell prior to expiration of the timer; and/or code 638 for resending the BFRQ message (or refraining from resending the BFRQ message) in the other cell based on the determining, wherein the BFRR message comprises one or more of the following types: a new transmission configuration indicator (TCI) state activation or reconfiguration for the Scell, a transmission using the candidate recovery beam for the Scell, or a deactivation command for the Scell.

In certain aspects, the processor 604 has circuitry configured to implement the code stored in the computer-readable medium/memory 612. The processor 604 includes circuitry 620 for performing BFD of a BPL associated with an Scell of a BS in CA; circuitry 622 for sending a BFRQ message in another cell of the BS, the BFRQ message including an indication of a candidate recovery beam for the Scell; circuitry 624 for starting a timer based on sending the BFRQ; circuitry 626 for determining whether to resend the BFRQ message in the other cell based on whether a beam failure recovery response (BFRR) message is received in the other cell prior to expiration of the timer; and/or circuitry 628 for resending the BFRQ message (or refraining from resending the BFRQ message) in the other cell based on the determining, wherein the BFRR message comprises one or more of the following types: a new transmission configuration indicator (TCI) state activation or reconfiguration for the Scell, a transmission using the candidate recovery beam for the Scell, or a deactivation command for the Scell.

Figure 7:
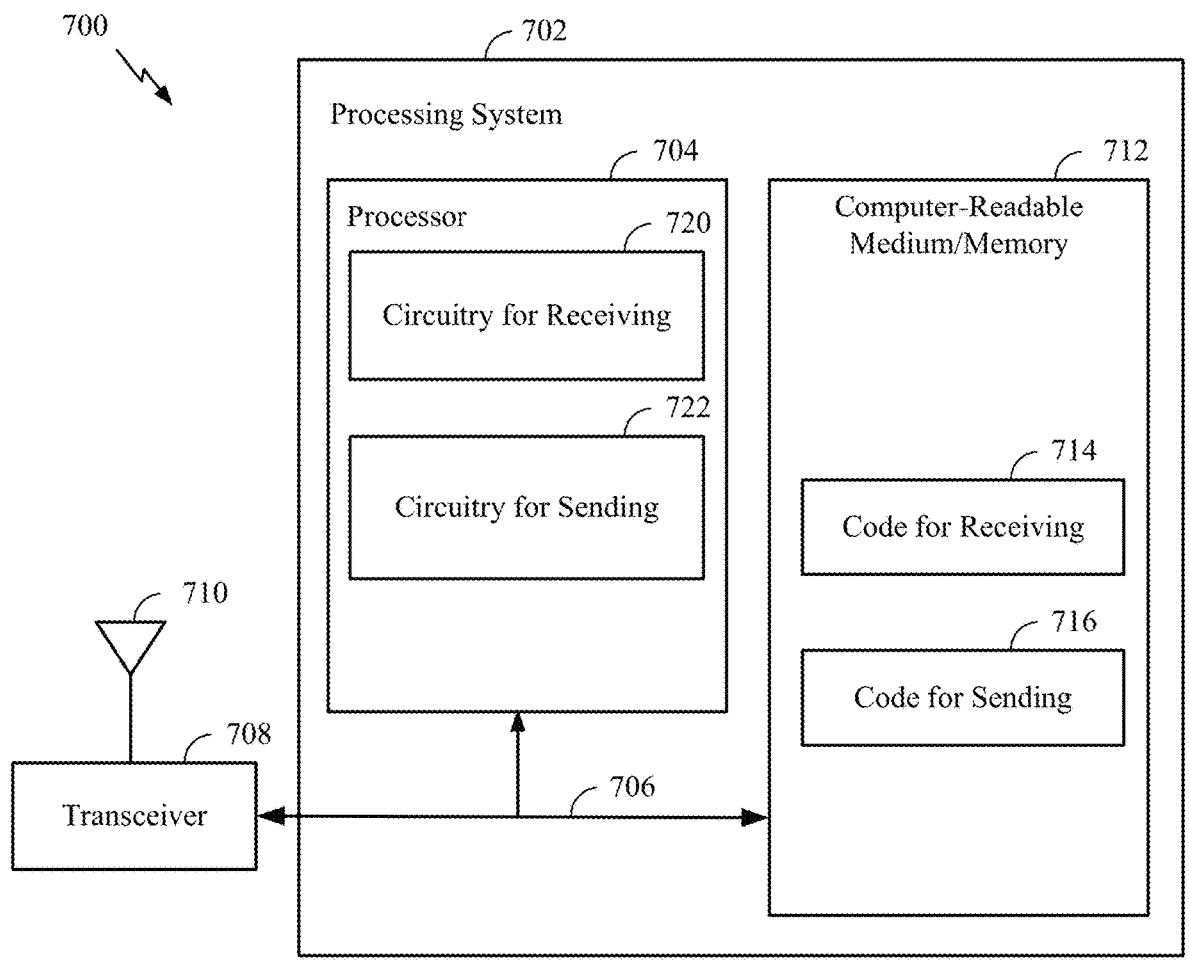
FIG. 7 illustrates a communications device that may include various components configured to perform operations for the techniques disclosed herein in accordance with aspects of the present disclosure.

FIG. 7 illustrates a communications device 700 (e.g., the BS 110a) that may include various components (e.g., corresponding to means-plus-function components) configured to perform operations for the techniques disclosed herein, such as the operations illustrated in FIG. 5. The communications device 700 includes a processing system 702 coupled to a transceiver 708 (e.g., a transmitter and/or receiver). The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/memory 712 is configured to store instructions (e.g., computer-executable code) that when executed by the processor 704, cause the processor 704 to perform the operations illustrated in FIG. 5, or other operations for performing the various techniques discussed herein for beam failure recovery. In certain aspects, computer-readable medium/memory 712 stores code 714 for receiving a BFRQ message in a cell from a UE, the BFRQ message including an indication of a candidate recovery beam for a Scell of the UE; and code 716 for sending a beam failure recovery response (BFRR) message to the UE in response to the BFRQ message, wherein the BFRR message comprises one or more of the following types: a new transmission configuration indicator (TCI) state activation or reconfiguration for the Scell, a transmission using the candidate recovery beam for the Scell, or a deactivation command for the Scell.

In certain aspects, the processor 704 has circuitry configured to implement the code stored in the computer-readable medium/memory 712. The processor 704 includes circuitry 720 for receiving a BFRQ message in a cell from a UE, the BFRQ message including an indication of a candidate recovery beam for an Scell of the UE; and circuitry 722 for sending a BFRR message to the UE in response to the BFRQ message, wherein the BFRR message comprises one or more of the following types: a new TCI state activation or reconfiguration for the Scell, a transmission using the candidate recovery beam for the Scell, or a deactivation command for the Scell.

EXAMPLE EMBODIMENTS

Embodiment 1: A method for wireless communication by a user equipment (UE), comprising: performing beam failure detection (BFD) of a beam pair link (BPL) associated with a secondary cell (Scell) of a base station (BS); sending a beam failure recovery request (BFRQ) message in another cell of the BS, the BFRQ message including an indication of a candidate recovery beam for the Scell; starting a timer based on sending the BFRQ; determining whether to resend the BFRQ message in the other cell based on whether a beam failure recovery response (BFRR) message is received prior to expiration of the timer; and resending the BFRQ message in the other cell based on the determining, wherein the BFRR message comprises one or more of the following types: a new transmission configuration indicator (TCI) state activation or reconfiguration for the Scell; a transmission using the candidate recovery beam for the Scell; or a deactivation command for the Scell.

Embodiment 2: The method of embodiment 1, wherein the BFRR message further comprises an uplink grant for a new transmission with a same hybrid automatic repeat request (HARM) process as an uplink channel carrying the BFRQ message.

Embodiment 3: The method of any of Embodiments 1 or 2, wherein the other cell is a primary cell.

Embodiment 4: The method of any of Embodiments 1-3, wherein the new TCI state activation or reconfiguration for the Scell is received in a media access control (MAC) control element (CE) on a physical downlink shared channel (PDSCH) in the other cell.

Embodiment 5: The method of any of Embodiments 1-4, wherein the new TCI state activation or reconfiguration for the Scell is received in the other cell.

Embodiment 6: The method of any of Embodiments 1-5, wherein the transmission using the candidate recovery beam for the Scell is a physical downlink control channel (PDCCH).

Embodiment 7: The method of any of Embodiments 1-6, wherein the transmission using the candidate recovery beam for the Scell is sent in a predefined resource.

Embodiment 8: The method of any of Embodiments 1-7, wherein the predefined resource comprises one or more frequency and time resources.

Embodiment 9: The method of any of Embodiments 1-8, wherein the transmission using the candidate recovery beam for the Scell is sent in a resource indicated to the UE.

Embodiment 10: The method of any of Embodiments 1-9, wherein the resource is indicated to the UE using radio resource control (RRC) signaling.

Embodiment 11: The method of any of Embodiments 1-10, further comprising monitoring a resource for the transmission using the candidate recovery beam for the Scell for a time period after sending the BFRQ message.

Embodiment 12: The method of any of Embodiments 1-11, wherein the time period is indicated to the UE.

Embodiment 13: The method of any of Embodiments 1-12, wherein the time period is indicated to the UE using radio resource control (RRC) signaling.

Embodiment 14: The method of any of Embodiments 1-13, wherein the time period is based on UE capability of the UE.

Embodiment 15: The method of any of Embodiments 1-14, wherein the monitoring comprises setting a receive beam of the UE to receive the candidate recovery beam for the Scell.

Embodiment 16: The method of any of Embodiments 1-15, wherein the deactivation command is received in a media access control (MAC) control element (CE) on a physical downlink shared channel (PDSCH) in the other cell.

Embodiment 17: The method of any of Embodiments 1-16, wherein the deactivation command is received in the other cell.

Embodiment 18: The method of any of Embodiments 1-17, further comprising receiving an indication of which one or more types of BFRR messages to monitor for.

Embodiment 19: The method of any of Embodiments 1-18, further comprising monitoring for BFRR messages of the indicated one or more types.

Embodiment 20: The method of any of Embodiments 1-19, further comprising determining one or more receive beams to use for monitoring based on the indicated one or more types.

Embodiment 21: The method of any of Embodiments 1-20, further comprising receiving the BFRR message, wherein the BFRR message comprises the deactivation command for the Scell; and deactivating the Scell based on receiving the BFRR message.

Embodiment 22: The method of any of Embodiments 1-21, further comprising: receiving the BFRR message, wherein the BFRR message comprises the new TCI state activation or reconfiguration for the Scell; and resetting a TCI state of the Scell to the new TCI state based on receiving the BFRR message.

Embodiment 23: The method of any of Embodiments 1-22, further comprising: receiving the BFRR message, wherein the BFRR message comprises the uplink grant; and resetting a TCI state of the Scell as the candidate recovery beam based on receiving the BFRR message.

Embodiment 24: The method of any of Embodiments 1-23, wherein the new TCI state activation or reconfiguration for the Scell is the candidate recovery beam for the Scell.

Embodiment 25: A method for wireless communication by a base station (BS), comprising: receiving a beam failure recovery request (BFRQ) message in a cell from a user equipment (UE), the BFRQ message including an indication of a candidate recovery beam for a secondary cell (Scell) of the UE; and sending a beam failure recovery response (BFRR) message to the UE in response to the BFRQ message, wherein the BFRR message comprises one or more of the following types: a new transmission configuration indicator (TCI) state activation or reconfiguration for the Scell; a transmission using the candidate recovery beam for the Scell; or a deactivation command for the Scell.

Embodiment 26: The method of Embodiment 25, wherein the BFRR message further comprises an uplink grant for a new transmission with a same hybrid automatic repeat request (HARQ) process as an uplink channel carrying the BFRQ message.

Embodiment 27: The method of any of Embodiments 25 or 26, wherein the cell is a primary cell.

Embodiment 28: The method of any of Embodiments 25-27, wherein the new TCI state activation or reconfiguration for the Scell is transmitted in a media access control (MAC) control element (CE) on a physical downlink shared channel (PDSCH) in the cell.

Embodiment 29: The method of any of Embodiments 25-28, wherein the new TCI state activation or reconfiguration for the Scell is transmitted in the cell.

Embodiment 30: The method of any of Embodiments 25-29, wherein the transmission using the candidate recovery beam for the Scell is a physical downlink control channel (PDCCH).

Embodiment 31: The method of any of Embodiments 25-30, wherein the transmission using the candidate recovery beam for the Scell is sent in a predefined resource.

Embodiment 32: The method of any of Embodiments 25-31, wherein the predefined resource comprises one or more frequency and time resources.

Embodiment 33: The method of any of Embodiments 25-32, wherein the transmission using the candidate recovery beam for the Scell is sent in a resource indicated to the UE.

Embodiment 34: The method of any of Embodiments 25-33, wherein the resource is indicated to the UE using radio resource control (RRC) signaling.

Embodiment 35: The method of any of Embodiments 25-34, wherein the deactivation command is transmitted in a media access control (MAC) control element (CE) on a physical downlink shared channel (PDSCH) in the cell.

Embodiment 36: The method of any of Embodiments 25-35, wherein the deactivation command is transmitted in the cell.

Embodiment 37: The method of any of Embodiments 25-36, further comprising transmitting to the UE an indication of which one or more types of BFRR messages to monitor for.

Embodiment 38: The method of any of Embodiments 25-37, wherein the new TCI state activation or reconfiguration for the Scell is the candidate recovery beam for the Scell.

Embodiment 39: A user equipment (UE), comprising: a memory; and a processor communicatively coupled to the memory, the processor configured to: perform beam failure detection (BFD) of a beam pair link (BPL) associated with a secondary cell (Scell) of a base station (BS); send a beam failure recovery request (BFRQ) message in another cell of the BS, the BFRQ message including an indication of a candidate recovery beam for the Scell; start a timer based on sending the BFRQ; determine whether to resend the BFRQ message in the other cell based on whether a beam failure recovery response (BFRR) message is received prior to expiration of the timer; and resend the BFRQ message (or refrain from resending the BFRQ message) in the other cell based on the determination, wherein the BFRR message comprises one or more of the following types: a new transmission configuration indicator (TCI) state activation or reconfiguration for the Scell; a transmission using the candidate recovery beam for the Scell; or a deactivation command for the Scell.

Embodiment 40: The UE of Embodiment 39, wherein the BFRR message further comprises an uplink grant for a new transmission with a same hybrid automatic repeat request (HARQ) process as an uplink channel carrying the BFRQ message.

Embodiment 41: The UE of any of Embodiments 39 and 40, wherein the new TCI state activation or reconfiguration for the Scell is received in a media access control (MAC) control element (CE) on a physical downlink shared channel (PDSCH) in the other cell.

Embodiment 42: The UE of any of Embodiments 39-41, wherein the new TCI state activation or reconfiguration for the Scell is received in the other cell.

Embodiment 43: The UE of any of Embodiments 39-42, wherein the transmission using the candidate recovery beam for the Scell is a physical downlink control channel (PDCCH).

Embodiment 44: The UE of any of Embodiments 39-43, wherein the transmission using the candidate recovery beam for the Scell is sent in a predefined resource.

Embodiment 45: A base station (BS), comprising: a memory; and a processor communicatively coupled to the memory, the processor configured to: receive a beam failure recovery request (BFRQ) message in a cell from a user equipment (UE), the BFRQ message including an indication of a candidate recovery beam for a secondary cell (Scell) of the UE; and send a beam failure recovery response (BFRR) message to the UE in response to the BFRQ message, wherein the BFRR message comprises one or more of the following types: a new transmission configuration indicator (TCI) state activation or reconfiguration for the Scell; a transmission using the candidate recovery beam for the Scell; or a deactivation command for the Scell.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). CdMA2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 4 and/or FIG. 5.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), comprising:
   receiving a first indication of which one or more types of beam failure recovery response (BFRR) messages to monitor for;
   performing a beam failure detection (BFD) of a beam pair link (BPL) associated with a secondary cell (Scell) of a base station (BS);
   sending a beam failure recovery request (BFRQ) message in another cell of the BS, the BFRQ message including a second indication of a candidate recovery beam for the Scell;
   starting a timer based on sending the BFRQ message;
   determining whether to resend the BFRQ message in the other cell based on whether a BFRR message is received prior to expiration of the timer; and
   resending the BFRQ message in the other cell when it is determined that the BFRR message is not received prior to expiration of the timer, wherein the BFRR message is one of the indicated one or more types, and wherein the indicated one or more types comprises one or more of the following types:
      an uplink grant for a new transmission with a same hybrid automatic repeat request (HARQ) process as an uplink channel carrying the BFRQ message;
      or
      a deactivation command for the Scell.

2. The method of claim 1, wherein the indicated one or more types further comprises
   a new transmission configuration indicator (TCI) state activation or reconfiguration for the Scell; or
   a transmission using the candidate recovery beam for the Scell.

3. The method of claim 2, wherein the new TCI state activation or reconfiguration for the Scell is received in a media access control (MAC) control element (CE) on a physical downlink shared channel (PDSCH) in the other cell.

4. The method of claim 2, wherein the new TCI state activation or reconfiguration for the Scell is received in the other cell.

5. The method of claim 2, wherein the transmission using the candidate recovery beam for the Scell is a physical downlink control channel (PDCCH).

6. The method of claim 2, wherein the transmission using the candidate recovery beam for the Scell is sent in a predefined resource.

7. The method of claim 2, wherein the transmission using the candidate recovery beam for the Scell is sent in a resource indicated to the UE.

8. The method of claim 7, wherein the resource is indicated to the UE using radio resource control (RRC) signaling.

9. The method of claim 2, further comprising:
   monitoring a resource for the transmission using the candidate recovery beam for the Scell for a time period after sending the BFRQ message.

10. The method of claim 9, wherein the monitoring comprises setting a receive beam of the UE to receive the candidate recovery beam for the Scell.

11. The method of claim 1, wherein the deactivation command is received in a media access control (MAC) control element (CE) on a physical downlink shared channel (PDSCH) in the other cell.

12. The method of claim 1, wherein the deactivation command is received in the other cell.

13. A method for wireless communication by a base station (BS), comprising:
   transmitting a first indication of which one or more types of beam failure recovery response (BFRR) messages to monitor for;
   receiving a beam failure recovery request (BFRQ) message in a cell from a user equipment (UE), the BFRQ message including a second indication of a candidate recovery beam for a secondary cell (Scell) of the UE; and
   sending a BFRR message to the UE in response to the BFRQ message, wherein the BFRR message is one of the indicated one or more types and comprises one or more of the following types:
      an uplink grant for a new transmission with a same hybrid automatic repeat request (HARQ) process as an uplink channel carrying the BFRQ message; or
      a deactivation command for the Scell.

14. The method of claim 13, wherein the indicated one or more types further comprises
   a new transmission configuration indicator (TCI) state activation or reconfiguration for the Scell; or
   a transmission using the candidate recovery beam for the Scell.

15. The method of claim 14, wherein the new TCI state activation or reconfiguration for the Scell is transmitted in a media access control (MAC) control element (CE) on a physical downlink shared channel (PDSCH) in the cell.

16. The method of claim 14, wherein the new TCI state activation or reconfiguration for the Scell is transmitted in the cell.

17. The method of claim 14, wherein the transmission using the candidate recovery beam for the Scell is a physical downlink control channel (PDCCH).

18. The method of claim 14, wherein the transmission using the candidate recovery beam for the Scell is sent in a predefined resource.

19. The method of claim 14, wherein the transmission using the candidate recovery beam for the Scell is sent in a resource indicated to the UE.

20. The method of claim 19, wherein the resource is indicated to the UE using radio resource control (RRC) signaling.

21. The method of claim 13, wherein the deactivation command is transmitted in a media access control (MAC) control element (CE) on a physical downlink shared channel (PDSCH) in the cell.

22. The method of claim 13, wherein the deactivation command is transmitted in the cell.

23. A user equipment (UE), comprising:
   a memory; and
   a processor communicatively coupled to the memory, the processor configured to:
      receive a first indication of which one or more types of beam failure recovery response (BFRR) messages to monitor for;
      perform a beam failure detection (BFD) of a beam pair link (BPL) associated with a secondary cell (Scell) of a base station (BS);
      send a beam failure recovery request (BFRQ) message in another cell of the BS, the BFRQ message including a second indication of a candidate recovery beam for the Scell;
      start a timer based on sending the BFRQ message;
      determine whether to resend the BFRQ message in the other cell based on whether a BFRR message is received prior to expiration of the timer; and
      resend the BFRQ message in the other cell when it is determined that the BFRR message is not received prior to expiration of the timer, wherein the BFRR message is one of the indicated one or more types, and wherein the indicated one or more types comprises one or more of the following types:
         an uplink grant for a new transmission with a same hybrid automatic repeat request (HARQ) process as an uplink channel carrying the BFRQ message; or
         a deactivation command for the Scell.

24. The UE of claim 23, wherein the indicated one or more types further comprises
   a new transmission configuration indicator (TCI) state activation or reconfiguration for the Scell; or
   a transmission using the candidate recovery beam for the Scell.

25. The UE of claim 24, wherein the new TCI state activation or reconfiguration for the Scell is received in a media access control (MAC) control element (CE) on a physical downlink shared channel (PDSCH) in the other cell.

26. The UE of claim 24, wherein the new TCI state activation or reconfiguration for the Scell is received in the other cell.

27. The UE of claim 24, wherein the transmission using the candidate recovery beam for the Scell is a physical downlink control channel (PDCCH).

28. The UE of claim 24, wherein the transmission using the candidate recovery beam for the Scell is sent in a predefined resource.

29. A base station (BS), comprising:
   a memory; and
   a processor communicatively coupled to the memory, the processor configured to:
      transmit a first indication of which one or more types of beam failure recovery response (BFRR) messages to monitor for;
      receive a beam failure recovery request (BFRQ) message in a cell from a user equipment (UE), the BFRQ message including a second indication of a candidate recovery beam for a secondary cell (Scell) of the UE; and
      send a BFRR message to the UE in response to the BFRQ message, wherein the BFRR message is one of the indicated one or more types and comprises one or more of the following types:
         an uplink grant for a new transmission with a same hybrid automatic repeat request (HARD) process as an uplink channel carrying the BFRQ message; or
         a deactivation command for the Scell.

* * * * *